A. F. REICHERT.
MOLD FOR SILO WALLS.
APPLICATION FILED JULY 10, 1911.
1,071,177.
Patented Aug. 26, 1913.
3 SHEETS—SHEET 3.
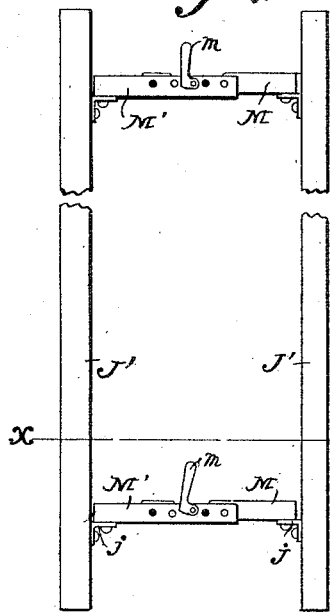
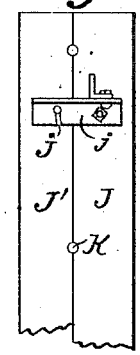
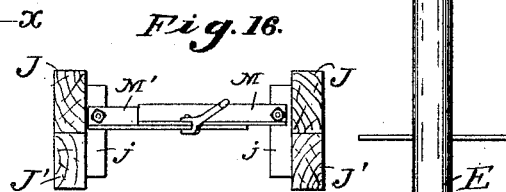
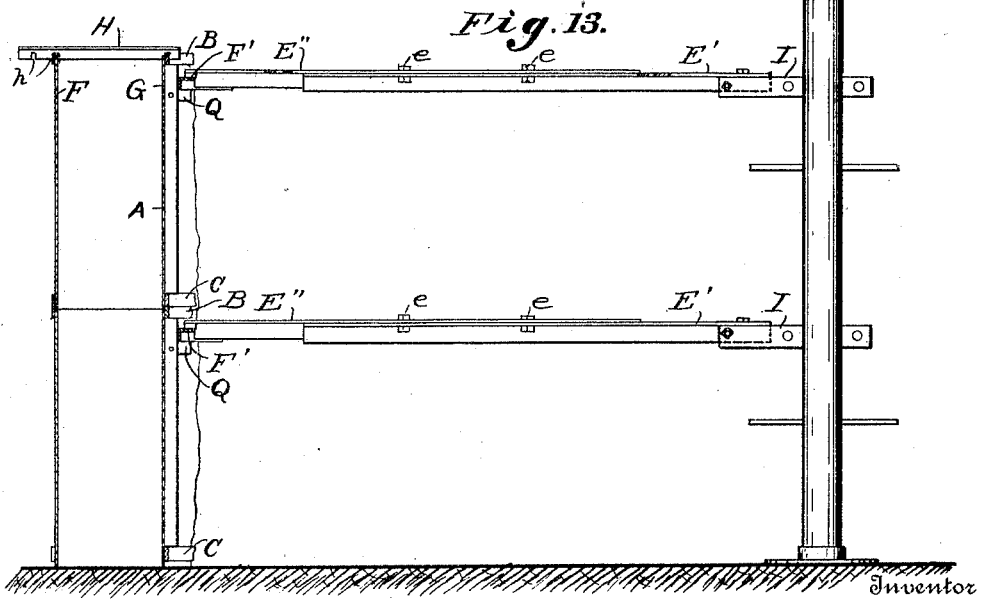

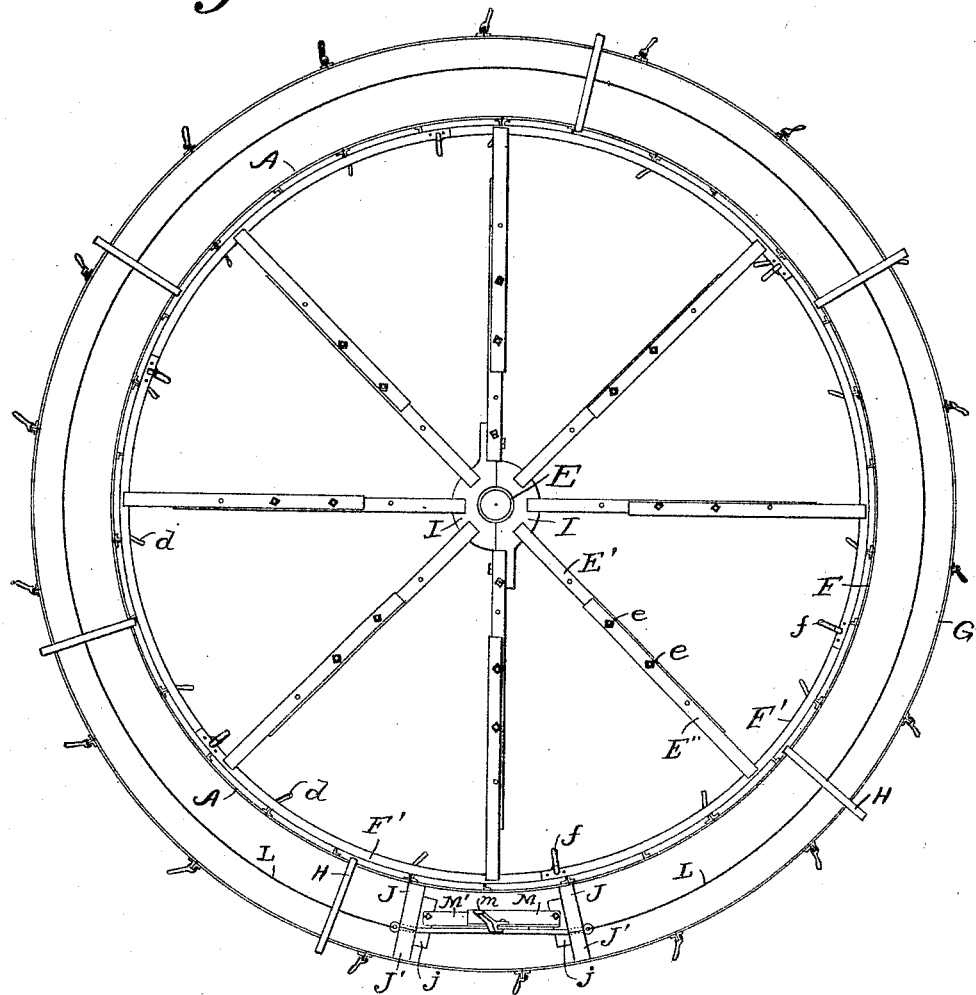

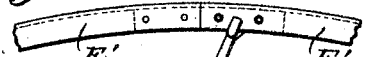
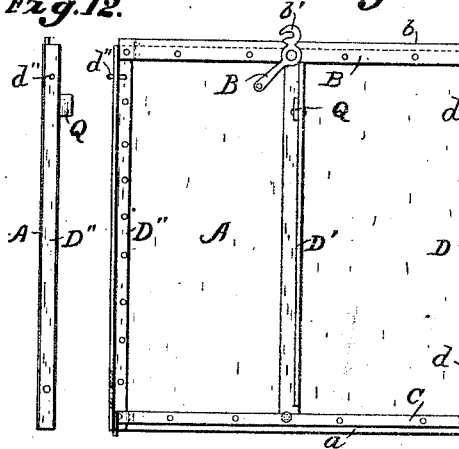
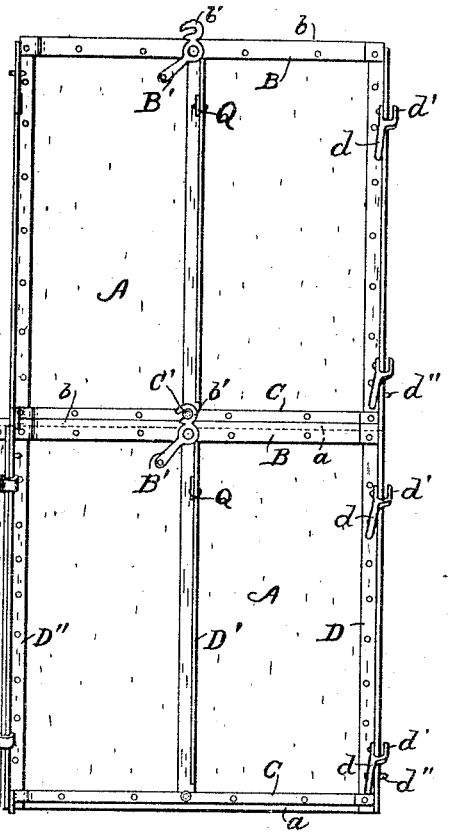
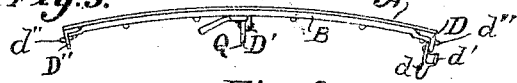
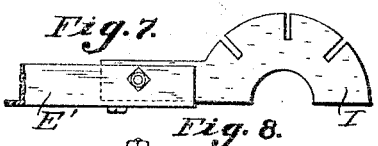
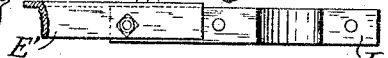
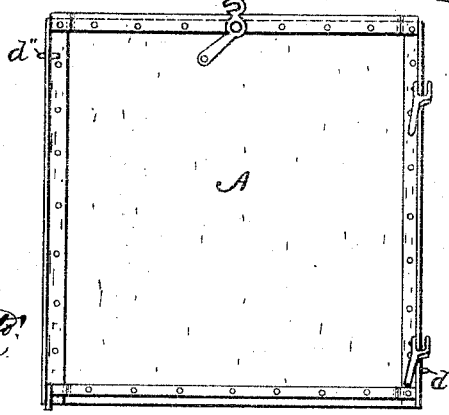
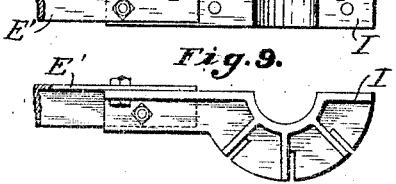

UNITED STATES PATENT OFFICE.

AUGUST F. REICHERT, OF MILWAUKEE, WISCONSIN, ASSIGNOR TO REICHERT MFG CO., OF MILWAUKEE, WISCONSIN, A CORPORATION OF WISCONSIN.

MOLD FOR SILO-WALLS.

1,071,177.  Specification of Letters Patent.  Patented Aug. 26, 1913.

Application filed July 10, 1911. Serial No. 637,757.

*To all whom it may concern:*

Be it known that I, AUGUST F. REICHERT, a citizen of the United States, residing at Milwaukee, county of Milwaukee, and State of Wisconsin, have invented new and useful Improvements in Molds for Silo-Walls, of which the following is a specification.

My invention relates to improvements in molds for concrete walls, with especial reference to that class of molds which are used for the manufacture of silos, cisterns, etc.

The object of this invention is to provide a form of mold comprising a series of like units which may be combined in such a manner as to form a cylindrical wall, said units being so formed as to produce a concrete wall having a smooth interior surface without shoulders or projections which might interfere with the settling of the contents of the silo.

A further object of my invention is to provide means whereby the units may be employed to produce cylindrical walls inclosing cistern or silo spaces of different diameters, and in which the units may be advanced, as the work progresses, by removing the units first placed in position as the concrete hardens behind them and replacing them in an advance position.

While I refer to my invention as being employed in the construction of silos, cisterns, etc., it will be understood that it is not essential that the cylinder be vertical, since it is obvious that it may be extended horizontally in the construction of tunnels, conduits and the like.

In the following description, reference is had to the accompanying drawings, in which—

Figure 1 is a plan view of a mold embodying my invention. Fig. 2 is a sectional view showing three interior mold sections as they appear when assembled and forming parts of two courses to be filled with concrete. Figs. 3, 4, 5 and 6 are detail views of angle iron reinforcing strips employed at the margins of the respective units, and showing the connecting levers. Figs. 7, 8 and 9 are detail views of the inner end portion of one of the reinforcing radial arms, and the clamping member for connecting it to a supporting standard. Fig. 10 is a detail view of one of the members used to temporarily connect the inner and outer walls of the mold. Fig. 11 is a detail view of the exterior surface of one of the exterior units. Fig. 12 is a detail view of one of the vertical reinforcing bars, constituting a marginal wall. Fig. 13 is a detail view in vertical section of one side of the mold, showing the units arranged to form a double wall together with the reinforcing apparatus connected with the central standard. Fig. 14 is a front elevation of the door-way frame. Fig. 15 is an inner or face view of one of the door frame members, showing the separable sections for embracing the reinforcing rings. Fig. 16 is a sectional view drawn on line $x$—$x$ of Fig. 14.

Like parts are identified by the same reference characters throughout the several views.

The inner walls of my improved mold are formed of comparatively thin pieces of sheet metal A, having their upper and lower margins reinforced by said segmentally curved bars B and C respectively, which bars are secured to the metal sheet A by bolts or rivets. The bar C is narrower than the bar B, and is secured to the metal sheet A in a position to leave a marginal strip $a$ exposed, as clearly shown in Fig. 2. The upper strip B is secured to the metal sheet A in such a manner as to project beyond (above) the margin of the sheet A a sufficient distance so that when two of these units are superposed, the projecting portion $b$ of the strip B, will lap over the projecting portion $a$, as clearly shown in Fig. 2. A lever B′, pivotally secured to the bar B, is provided with a hook $b'$ adapted to engage a projecting stud or pin C′ on the bar C of the superposed unit, whereby said units may be connected together.

Each of the units is reinforced vertically by a set of angle iron bars D, D′ and D″. The bars D and D″ are bolted or riveted to the side margins of the sheet A, with one flange extending outwardly from the inner surface of said sheet A. Forked levers $d$ are pivotally connected with the outwardly extending flange of the angle iron member D, and one arm $d'$ of these forked levers is offset over the angle iron flange in a position to engage the angle iron flange D″ of a similar unit, when said units are adjusted with side edges abutting. The projecting flanges of the angle iron member D are also provided with pins $d''$, which project laterally and are adapted to be received in holes formed in the projecting flange D″ of an adjacent unit.

I preferably do not use angle iron members at the top and bottom for the reason that in using these mold units for cylindrical walls of different sizes, it is necessary that their curvature be changed, and by using flat bars B and C of flexible material, I am enabled to bend each unit to a greater or less degree by applying pressure thereto at the center. The outer wall of the mold is composed of units substantially the same in construction as those above described, with the exception that the vertical reinforcing angle iron bars D′ are omitted, as appears in Fig. 11.

The several units are assembled as illustrated in Fig. 1. A central post E is employed, around which the units are arranged to form a double wall F and G, the units composing the outer wall being supported from the inner wall by T iron connecting members H, having slots h in one flange, in which slots the margins of the units are adapted to be received. The walls are reinforced from the central post E, and are also pressed into a true circular shape by a set of radial arms formed in adjustable sections E′ and E″, connected with each other by bolts e, the arms having a series of holes for the reception of said bolts, whereby said sections may be adjusted to lengthen or shorten the arms. A ring connects the outer ends of these arms, and is composed of segmental bars F′, connected together by connecting levers f, similar to the levers d above described. The inner sections E′ of the radial arms are connected with the central post E by clamping members I, which are formed in half sections adapted to embrace the post and are bolted to the inner sections E′ of the radial arms, as best shown in Figs. 7, 8 and 9. The outer sections E″ of these arms are notched and adapted to engage one flange of the angle iron segments F′.

The door frame is composed of a set of two upright bars J and J′, connected by a latch j, which is pivoted to the bar J and provided with a notch adapted to receive a pin j′ on the bar J′. Holes K are formed at the meeting edges of these bars through which reinforcing rings L, (Fig. 1) are passed, which reinforcing rings are to be embedded in the concrete which is filled in between the inner and outer walls F and G respectively. The bars J and J′ at the respective sides of the door way are mutually supported from each other by braces M and M′, which are adapted to lap together and to be connected with each other by levers m, similar to the levers d.

The levers d, f and m are similar in construction and mode of operation to those shown and described in my former Patent Number 805819, dated November 28, 1905, and therefore need not be described with greater particularity. The mold units are also somewhat similar in form, but the marginal reinforcing bars at the top and bottom of each unit in the construction herein described, is flexible, whereas in my former patent, the top and bottom bars are formed of angle iron and are rigid.

In assembling the units to form a silo or cistern wall, the units of the outer and inner wall are placed in abutting side contact with each other in the respective walls, to form two rings of a generally circular form around the central post E, the segmental bars F′ being adjusted in position and supported from the units which form the interior wall of the mold, by brackets Q, (Fig. 2) mounted upon the bars D′ of the interior wall units. The radial arms are then interposed between the ring segments F′ and the connecting members I on the central post, said radial arm sections being properly adjusted in correspondence with the diameter of the ring. The outer wall is loosely supported from the inner wall at the top margins of said walls by the connecting members H. The ring formed by the segments F′ determines the interior diameter of the structure.

When the concrete is filled in, the inner wall is pressed against these rings, a plurality of which are employed as shown in Fig. 13. The rings being circular, it is obvious that the interior wall of the mold will be supported in a true circle, and the outer wall being spaced from the inner wall by the temporary connecting members H, will necessarily also assume a circular form. When the first rows of inner and outer units have been adjusted and the spaces between them substantially filled with concrete, the second row or tier of units is adjusted in position on top of the first units, the units of the second tier being connected together and reinforced by radial segments and radial arms from the central post in the same manner as the first row of units, the hooked levers B′ being employed to connect the superposed units with each other in a position with the margins a of the upper units abutting the top margins of the sheets composing the lower units and lapping the projecting portions of the bars B on said lower units.

While I have described these bars B and the bars C as being curved, it is not essential that they should be curved when originally applied to the sheet metal pieces A, in view of the fact that said bars are flexible. I prefer, however, to use curved bars adapted to form a medium sized cistern or silo without additional flexion. When so formed, it will not be necessary to bend them very far from their normal form to increase or decrease the diameter of the circle occupied by the mold wall.

I claim—

1. A cistern or silo mold, comprising inner and outer walls, each formed of a series of curved units, means for connecting said units in each wall of the mold at their respective margins, supporting members secured to the interior wall units, a reinforcing ring composed of segments mounted upon said supporting members, a central post, clamping members engaging the post and provided with outwardly extending flanges having radial slots therein, and removable radial arms formed of angle iron, having one flange engaged in said slots, and having notches in their outer ends receiving the reinforcing ring.

2. A cistern or silo mold, comprising inner and outer walls, each formed of a series of curved units, means for connecting said units in each wall of the mold at their respective margins, supporting members secured to the interior wall units, a reinforcing ring composed of segments mounted upon said supporting members, a central post, clamping members engaging the post and provided with outwardly extending flanges having radial slots therein, and removable radial arms formed of angle iron, certain of them having one flange engaged in said slots, and having notches in their outer ends receiving the reinforcing ring, and another of said arms being permanently secured to each clamping member and removable with it; said radial arms being formed in adjustable sections.

In testimony whereof I affix my signature in the presence of two witnesses.

AUGUST F. REICHERT.

Witnesses:
 LEVERETT C. WHEELER,
 I. D. BREMERE.